United States Patent
Hwang

(10) Patent No.: US 9,928,576 B2
(45) Date of Patent: Mar. 27, 2018

(54) DENOISING METHOD AND APPARATUS FOR MULTI-CONTRAST MRI

(71) Applicant: INDUSTRY-ACADEMIC COOPERATION FOUNDATION, YONSEI UNIVERSITY, Seoul (KR)

(72) Inventor: Do Sik Hwang, Seoul (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 92 days.

(21) Appl. No.: 14/529,366

(22) Filed: Oct. 31, 2014

(65) Prior Publication Data
US 2015/0139516 A1 May 21, 2015

(30) Foreign Application Priority Data

Nov. 21, 2013 (KR) .................. 10-2013-0141824

(51) Int. Cl.
*G06K 9/00* (2006.01)
*G06T 5/00* (2006.01)
*G06T 5/50* (2006.01)

(52) U.S. Cl.
CPC .............. *G06T 5/002* (2013.01); *G06T 5/50* (2013.01); *G06T 2207/10076* (2013.01); *G06T 2207/10088* (2013.01); *G06T 2207/20076* (2013.01); *G06T 2207/20182* (2013.01); *G06T 2207/30016* (2013.01)

(58) Field of Classification Search
CPC . G06T 2207/10076; G06T 2207/10088; G06T 2207/20182; G06T 5/002; G06T 5/50
See application file for complete search history.

(56) References Cited

U.S. PATENT DOCUMENTS

| | | | | |
|---|---|---|---|---|
| 5,594,807 A * | 1/1997 | Liu | ........... | G06T 5/008 382/128 |
| 5,602,934 A * | 2/1997 | Li | ........... | G01R 33/56 382/128 |
| 7,551,756 B2 * | 6/2009 | Chupeau | ........... | G06K 9/00228 348/77 |
| 7,623,691 B2 * | 11/2009 | Hein | ........... | G06T 5/50 378/21 |
| 7,813,536 B2 * | 10/2010 | Ma | ........... | G06K 9/34 382/128 |
| 8,346,011 B2 * | 1/2013 | Kelm | ........... | G06T 5/50 382/270 |
| 2004/0066978 A1 * | 4/2004 | Nanbu | ........... | G06T 5/20 382/261 |
| 2006/0078182 A1 * | 4/2006 | Zwirn | ........... | G06T 7/0012 382/128 |
| 2007/0014489 A1 * | 1/2007 | Sun | ........... | G06T 7/0012 382/294 |

(Continued)

*Primary Examiner* — Gandhi Thirugnanam
(74) *Attorney, Agent, or Firm* — Ladas & Parry LLP

(57) ABSTRACT

A denoising method and apparatus for multi-contrast MRI's are disclosed. An aspect of the invention provides a denoising method for an MRI that includes: acquiring multiple MRI's having different contrast levels for the same site; determining pixels corresponding to the same tissue by using the MRI's; and calculating a new luminance value for the pixels by using luminance values of the pixels that are determined to be belonging to the same tissue.

5 Claims, 4 Drawing Sheets

(56) References Cited

U.S. PATENT DOCUMENTS

| | | | |
|---|---|---|---|
| 2007/0217666 A1* | 9/2007 | Gal | G01T 1/1642 382/131 |
| 2008/0292194 A1* | 11/2008 | Schmidt | G06T 7/0012 382/217 |
| 2008/0317317 A1* | 12/2008 | Shekhar | G06T 3/0081 382/131 |
| 2009/0097722 A1* | 4/2009 | Dekel | G06T 7/0028 382/128 |
| 2010/0016724 A1* | 1/2010 | Arai | A61B 8/08 600/443 |
| 2010/0097061 A1* | 4/2010 | Zhu | A61B 5/02007 324/309 |
| 2010/0134629 A1* | 6/2010 | Lindop | A61B 8/08 348/163 |
| 2010/0145197 A1* | 6/2010 | Stapf | A61B 5/416 600/445 |
| 2010/0272340 A1* | 10/2010 | Bar-Aviv | G06T 5/20 382/131 |
| 2011/0268328 A1* | 11/2011 | Bar-Aviv | G06T 5/50 382/128 |
| 2011/0306869 A1* | 12/2011 | Hwang | A61B 8/14 600/411 |
| 2012/0121153 A1* | 5/2012 | Xue | G06T 5/50 382/131 |
| 2013/0216113 A1* | 8/2013 | O'Connor | A61B 6/482 382/128 |
| 2013/0245479 A1* | 9/2013 | Hwang | A61B 5/7203 600/521 |
| 2013/0322710 A1* | 12/2013 | Notte | G06K 9/34 382/128 |
| 2014/0303486 A1* | 10/2014 | Baumgartner | A61B 19/5244 600/414 |
| 2015/0011866 A1* | 1/2015 | Baumgartner | A61M 5/007 600/411 |
| 2015/0139516 A1* | 5/2015 | Hwang | G06T 5/50 382/131 |
| 2015/0262027 A1* | 9/2015 | Satomi | G06K 9/00234 382/128 |
| 2016/0069970 A1* | 3/2016 | Rearick | G01R 33/3854 324/309 |

* cited by examiner

DENOISING METHOD AND APPARATUS FOR MULTI-CONTRAST MRI

CROSS-REFERENCE TO RELATED APPLICATIONS

This application claims the benefit of Korean Patent Application No. 10-2013-0141824, filed with the Korean Intellectual Property Office on Nov. 21, 2013, the disclosure of which is incorporated herein by reference in its entirety.

BACKGROUND

1. Technical Field

The present invention relates to a denoising method and apparatus for multi-contrast MRI's, more particularly to a denoising method and apparatus that can reduce the feel of artificiality while providing clear boundaries in the MRI's.

2. Description of the Related Art

A magnetic resonance image (MRI) is obtained by having a human body enter an apparatus that is equipped with a large magnet for generating a magnetic field, generating high-frequency waves to cause resonation in the hydrogen nuclei present in a body part, measuring the different signals released from the various tissues, and using a computer to reconstruct an image.

That is, when the apparatus equipped with a magnet emits high-frequency waves to the human body, the body may emanate echo signals, which are received, converted into digital information, and reconstructed into an image.

Unlike simple X-ray photography or CT scans, which are the medical methods that use X-ray radiation, magnetic resonance imaging is a medical imaging method that uses high-frequency waves, which are a form of non-ionizing radiation, and is thus essentially harmless to the human body. Using a magnetic field and radio frequency waves (i.e. non-ionizing radiation), which are harmless to the human body, magnetic resonance imaging can provide better contrast in internal soft tissues even without a contrast agent, compared to a CT scan, and can provide information related to the biochemical properties of tissues containing hydrogen nuclei.

Magnetic resonance imaging is similar to the CT scan in that it provides a cross-section of the human body, but whereas a CT scan focuses mainly on horizontal cross-section images, showing a horizontal cross section of the human body, magnetic resonance imaging can freely obtain images along horizontal directions, vertical directions, diagonal directions, etc., as desired, without requiring the patient to change positions.

Since a magnetic resonance image would be used by a doctor to diagnose the conditions of a patient, it is critical that noise be eliminated for improved image analysis and quantitative analysis.

A conventional method of removing noise in an image is low pass filtering (LPF). Low pass filtering employs a filter that uses average values of surrounding pixels, and while it can be effective in cases where there are no correlations between adjacent pixels, it may result in blurring and may lower the resolution of an image.

To improve this, other filters have been developed, such as the median filter, the anisotropic diffusion filter, etc. Although these filters do improve performance in noise removal, the application of such non-linear filters may cause an image to look unnatural, and detailed features may be erased.

These methods of denoising may not be suitable for magnetic resonance imaging, which especially requires detailed image analysis for accurate diagnosis.

SUMMARY

To resolve the problems above in the related art, an aspect of the invention is to propose a denoising method and apparatus for multi-contrast MRI's that can provide clear boundaries without causing blurring.

To achieve the objective above, an aspect of the invention provides a denoising method for an MRI that includes: acquiring multiple MRI's having different contrast levels for the same site; determining pixels corresponding to the same tissue by using the MRI's; and calculating a new luminance value for the pixels by using luminance values of the pixels that are determined to be belonging to the same tissue.

The step of determining can include: calculating a similarity level between a first pixel and a second pixel from the multiple MRI's by using a difference in luminance value between the first pixel and the second pixel; and determining whether or not the first pixel and the second pixel belong to the same tissue by comparing the similarity level with a preset threshold.

The step of calculating the new luminance value can include: determining the new luminance value for the first pixel and the second pixel from a weighted average of luminance values of the first pixel and the second pixel based on the similarity level between the first pixel and the second pixel.

The step of calculating the new luminance value can include: determining new luminance values for all of the pixels by calculating weighted averages of luminance values for all pixels of the multiple MRI's.

Another aspect of the invention provides a denoising method for an MRI that includes: acquiring multiple MRI's having different contrast levels for the same site; calculating the probability that pixels located in a preset area belong to the same tissue by using the MRI's; and calculating a new luminance value for the pixels by using the probability of belonging to the same tissue.

Still another aspect of the invention provides a computer-readable recorded medium on which is recorded a program of instructions for performing the method described above.

Yet another aspect of the invention provides a denoising apparatus for an MRI that includes: an MRI acquisition unit configured to acquire multiple MRI's for having different contrast levels on the same site; a same-tissue determiner unit configured to determine pixels corresponding to the same tissue by using the MRI's; and a filtering unit configured to calculate a new luminance value for the pixels by using luminance values of the pixels that are determined to be belonging to the same tissue.

According to certain embodiments of the invention, the pixels corresponding to the same tissue can first be determined in MRI's having different contrast levels, and filtering can be performed based on this, so that the feel of artificiality can be accurately removed while providing clear boundaries in the MRI.

Additional aspects and advantages of the present invention will be set forth in part in the description which follows, and in part will be obvious from the description, or may be learned by practice of the invention.

DETAILED DESCRIPTION

Figure 1:
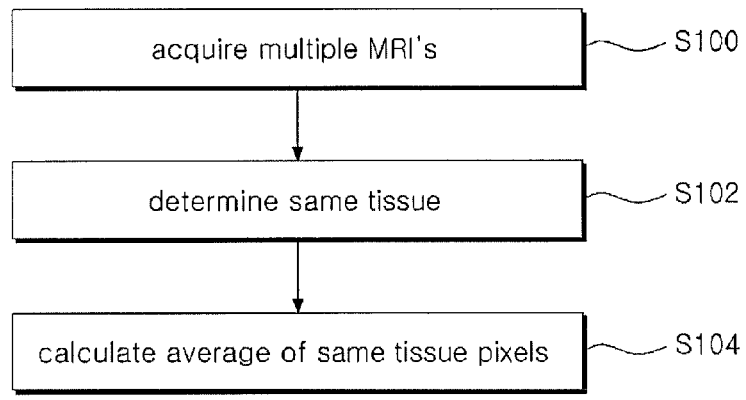
FIG. 1 is a flowchart of a process for removing noise in MRI's according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings. To aid the overall understanding of the invention, those components that are the same or are in correspondence are rendered the same reference numeral regardless of the figure number.

The present invention relates to a method and apparatus for removing noise by considering the probability of certain pixels belonging to the same tissue based on changes in luminance values in multiple MRI's having different contrast levels.

An apparatus for removing noise in MRI's can be a computing apparatus that is connected to a magnetic resonance imaging equipment to acquire MRI's and executes an application for analyzing and processing the MRI's.

FIG. 1 is a flowchart of a process for removing noise in MRI's according to an embodiment of the invention.

Referring to FIG. 1, a denoising apparatus according to an embodiment of the invention may acquire multiple MRI's, which have different contrast levels, for the same site (operation 100).

Operation 100 is to acquire multi-contrast MRI's for the same site by using different image-acquisition protocols.

Figure 2:
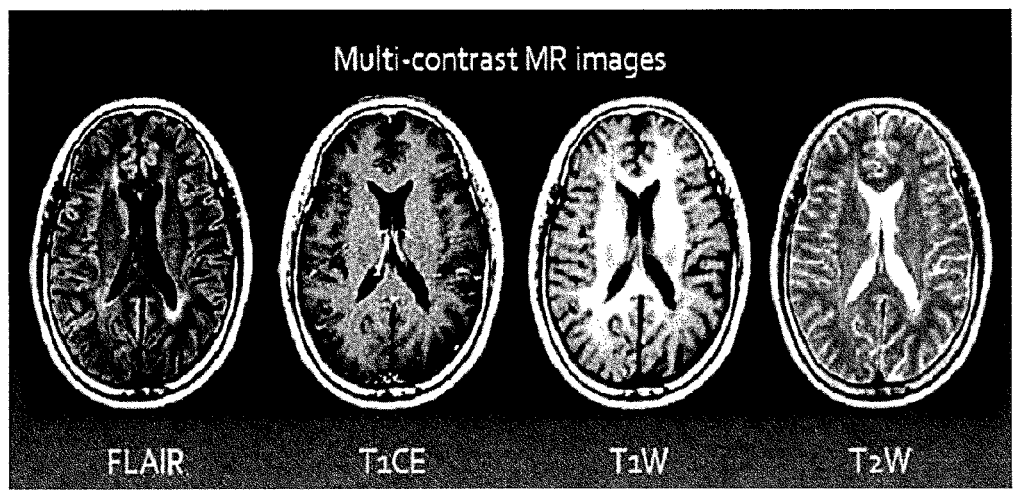
FIG. 2 shows an example of multi-contrast MRI's.

FIG. 2 shows an example of multi-contrast MRI's, where the multi-contrast MRI's can include FLAIR (fluid-attenuated inversion-recovery), T1CE (T1-weighted contrast-enhanced), T1W (T1-weighted), and T2W (T1-weighted) images.

The multi-contrast MRI's are not limited to the examples above, and the present invention can use any image that can be acquired by a relaxing of high-frequency pulses, etc., such as PDW (proton density weighted), DWI (diffusion-weighted image) images, and the like.

A denoising apparatus according to an embodiment of the invention may determine whether or not different pixels belong to the same tissue in the multiple MRI's by using the differences in luminance values of the pixels (operation 102).

In multi-contrast MRI's, the signals created at each tissue may have unique properties according to the type of tissue, and as such, the changes in luminance values for a pixel in the respective multi-contrast MRI's may be similar for the same type of tissue.

Figure 3:
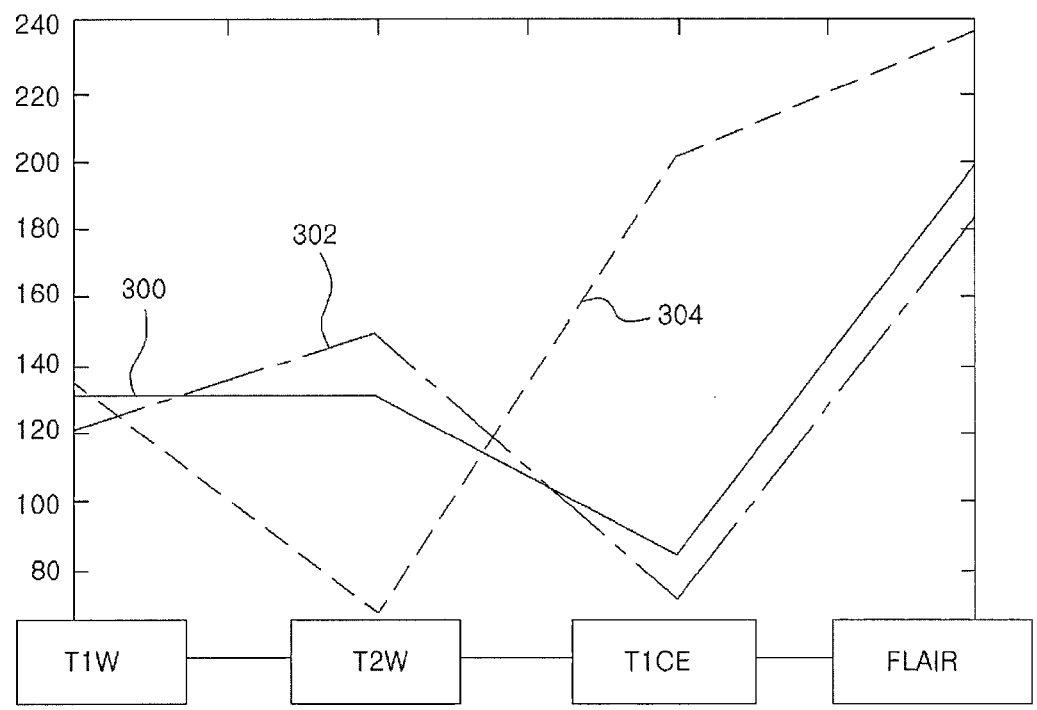
FIG. 3 illustrates signal evolution in the pixels of MRI's having different contrast levels.

FIG. 3 illustrates the change in signals (signal evolution) in the pixels of MRI's having different contrast levels, where the changes in luminance values for three different pixels are shown.

Referring to FIG. 3, it can be seen that the first pixel 300 and the second pixel 302 show similar trends in the changes in luminance values in the MRI's having different contrast levels, and it can thus be determined that the first pixel 300 and the second pixel 302 represent a similar tissue.

Here, the statement that the changes in luminance values are similar means that the differences in luminance values are not great for the particular pixels in the respective MRI's having different contrast levels.

On the other hand, the changes in luminance values for the first pixel 300 and the third pixel 304 are not similar, and it can be determined that these pixels belong to different tissues.

According to an embodiment of the invention, although it may not be easy to distinguish different tissues with the T1W protocol in FIG. 3, it can be easy to distinguish the tissues by using the MRI's having different contrast levels such as the T2W, T1CE, and FLAIR images.

According to an embodiment of the invention, the denoising apparatus may calculate the difference between the luminance value of the first pixel and the luminance value of the second pixel in each of the multiple MRI's in operation 102.

The difference in luminance value can be obtained by Equation 1 shown below.

$$D(r, s) = \frac{|S(r) - S(s)|}{h(r)} = \sum_{n=1}^{N} \frac{|S(r, t_n) - S(s, t_n)|}{h(r)} \quad \text{[Equation 1]}$$

Here, r and s represent the positions of pixels (expressed as vectors);

S(r) represents the signal (luminance value) at position r;

$t_n$ represents a contrast index $S(r, t_n)$ represents the signal (luminance value) at position r in an MRI having a different contrast level;

h(r) represents a normalization factor (applied at position r) compensating for the effect of noise; and D(r, s) represents the difference in luminance values between the tissue corresponding to position r and the tissue corresponding to position s.

Afterwards, the similarity level between the first pixel and the second pixel can be calculated based on the difference in luminance values as in Equation 2 shown below.

$$\omega_p(r, s) := \frac{1}{\zeta_r} e^{-D(r,s)} \quad \text{[Equation 2]}$$

for $$s \in B_p(r)$$

$\omega_p(r, s)$ represents the similarity level between the pixels at positions r and s.

The similarity level, which indicates the degree of difference between two pixels, can be determined based on the value of D(r, s) and can be defined as a weighting factor.

The greater the difference D(r, s), the lower the similarity level, and the lower the effect applied when obtaining a weighted average. The smaller the difference D(r, s), the higher the similarity level, and the greater the effect applied when obtaining a weighted average. Thus, a small D(r, s) indicates a high likelihood of r and s belonging to the same tissue (high probability of belonging to the same tissue) and therefore may provide an increased impact during weighted averaging.

$\zeta_r$ represents a normalization constant.

B represents an area surrounding position r (i.e. filtering is performed only in this area). B can be a local area surrounding position r and can be expanded to the entire image.

If the calculated similarity level is greater than a preset threshold, then it can be determined that the pixels belong to the same tissue.

If it is determined that the pixels belong to the same tissue in operation 102, then the denoising apparatus may determine new luminance values for the first pixel and the second pixel by using the luminance value of the first pixel and the luminance value of the second pixel (operation 104).

Operation 104 may be defined as a filtering process based on tissue information, and in operation 104, the denoising apparatus may determine a new luminance value for the first pixel and second pixel by taking a weighted average of the luminance values of the first and second pixels based on the similarity level calculated in operation 102.

The weight used in the weighted average may be the similarity level described above.

Equation 3 may be used for filtering according to an embodiment of the invention.

$$S_{NL}(r, t_n) := \sum_{s \in B_\rho(r)} \omega_\rho(r, s) S(r, t_n)$$ [Equation 3]

$S_{NL}(r, t_n)$ represents the new luminance value for the pixel at position r.

Operation 104 may be performed for all pixels of an MRI and may be performed in the same manner for all of the MRI's.

The descriptions above refer to determining whether certain different pixels belong to the same tissue and then performing filtering by obtaining a weighted average for the pixels corresponding to the same tissue.

According to another embodiment of the invention, the denoising apparatus can calculate the probability of pixels belonging to the same tissue for certain pixels located within a preset area and can perform the filtering accordingly.

The level of similarity can be calculated based on the differences in luminance values for pixels located in preset areas of the respective multi-contrast MRI's, and a new luminance value of the pixels can be determined based on the similarity level by way of a weighted average. In this case, the procedure for comparing the calculated similarity level with a preset threshold can be omitted.

Figure 4:
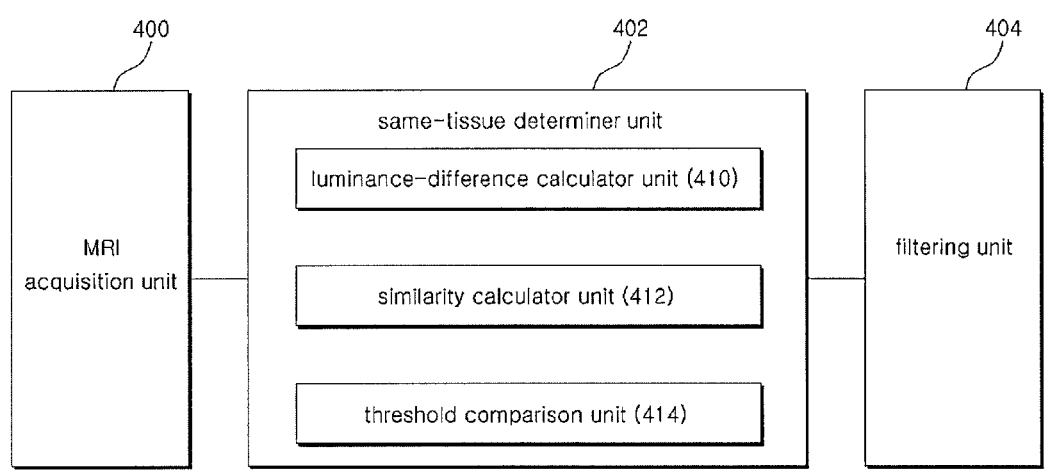
FIG. 4 illustrates the composition of an MRI denoising apparatus according to an embodiment of the invention.

FIG. 4 illustrates the composition of an MRI denoising apparatus according to an embodiment of the invention.

As illustrated in FIG. 4, an MRI denoising apparatus according to an embodiment of the invention can include an MRI acquisition unit 400, a same-tissue determiner unit 402, and a filtering unit 404.

The MRI acquisition unit 400 may acquire multiple MRI's, each having a different contrast level.

The same-tissue determiner unit 402 may determine pixels corresponding to the same tissue by using the multiple MRI's.

A same-tissue determiner unit 402 according to an embodiment of the invention can include a luminance-difference calculator unit 410, a similarity calculator unit 412, and a threshold comparison unit 414.

The luminance-difference calculator unit 410 may calculate the differences in luminance values for different pixels in each of the MRI's having different contrast levels, and the similarity calculator unit 412 may calculate the similarity level between the different pixels by using the differences in luminance values.

The threshold comparison unit 414 may compare the similarity level calculated as above with a preset threshold to determine whether or not the different pixels belong to the same tissue.

The filtering unit 404 may use the similarity level calculated beforehand, for pixels that were determined as belonging to the same tissue, to take a weighted average and determine new luminance values for the pixels.

According to an embodiment of the invention, the filtering, i.e. denoising, may be performed with a procedure for determining whether or not certain pixels represent the same tissue type, so that the resulting image can have a less artificial feel while providing clear boundaries.

Figure 5:
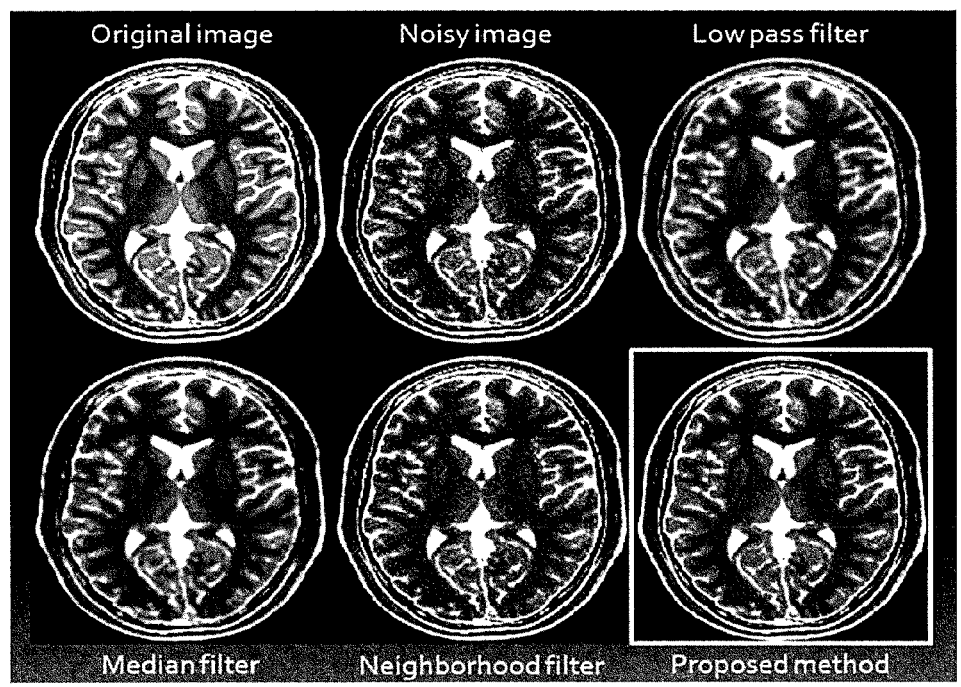
FIG. 5 and FIG. 6 show examples of images from which noise was removed according to an embodiment of the invention and according to conventional techniques.
Figure 6:
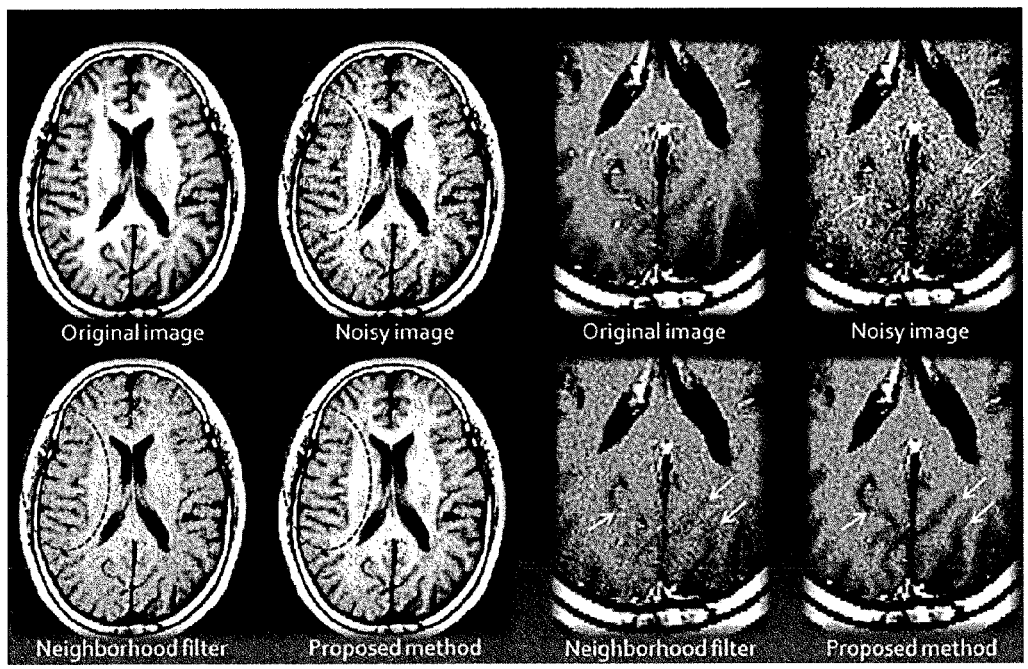

FIG. 5 and FIG. 6 show examples of images from which noise was removed according to an embodiment of the invention and according to conventional techniques.

As illustrated in FIG. 5 and FIG. 6, the denoising based on an embodiment of the invention can provide clearer boundaries with less artificiality compared to the other techniques.

Figure 7:
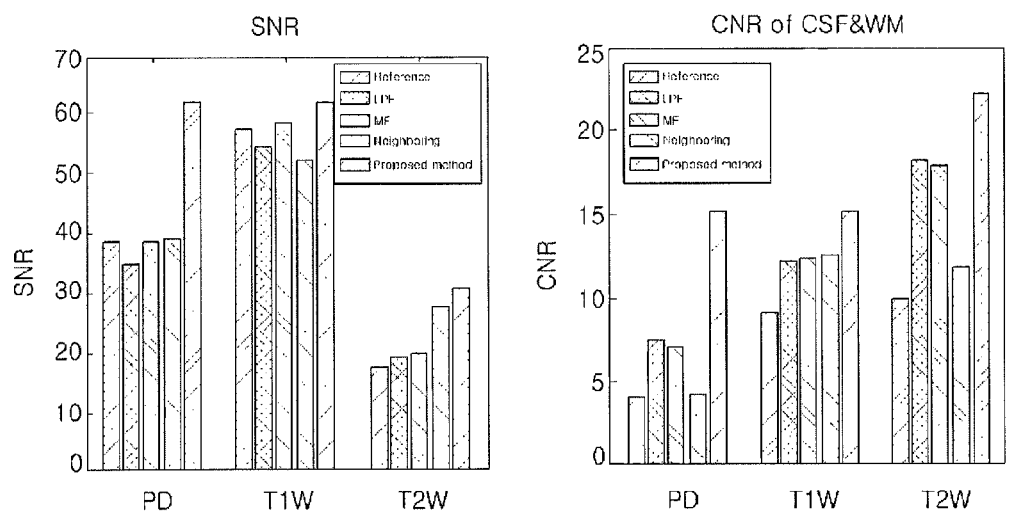
FIG. 7 show graphs representing the SNR (signal to noise ratio) and the CNR (carrier to noise ratio) in images from which noise was removed according to an embodiment of the invention and according to conventional techniques.

FIG. 7 show graphs representing the SNR (signal to noise ratio) and the CNR (contrast to noise ratio) in images from which noise was removed according to an embodiment of the invention and according to conventional techniques.

In FIG. 7, it can be seen that the denoising based on an embodiment of the invention can improve both the SNR and the CNR.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A denoising method for an MRI, the denoising method comprising:
   acquiring a plurality of MRI's for a same site using different image-acquisition protocols, such that the MRI's have different contrast levels;
   determining pixels in each of the plurality of MRI's corresponding to a same tissue by using the plurality of MRI's; and
   calculating a new luminance value for the pixels by using luminance values of the pixels that are determined to be belonging to the same tissue in said determining;
   wherein said determining comprises:
      calculating a similarity level between a first pixel and a second pixel from the plurality of MRI's by using a difference in luminance value of the first pixel and the second pixel in each of the plurality of MRI's, wherein the first and second pixels are from a single MRI; and
      determining whether or not the first pixel and the second pixel belong to a same tissue by comparing the similarity level with a preset threshold, and
   wherein said calculating the new luminance value comprises determining the new luminance value for the first pixel and the second pixel from a weighted average of luminance values of the first pixel and the second pixel based on the similarity level between the first pixel and the second pixel.

2. A non-transitory recorded medium readable by a computer, tangibly embodying a program of instructions for performing a denoising method for an MRI, the denoising method comprising:
   acquiring a plurality of MRI's for a same site using different image-acquisition protocols, such that the MRI's have different contrast levels
   determining pixels in each of the plurality of MRI's corresponding to a same tissue by using the plurality of MRI's; and
   calculating a new luminance value for the pixels by using luminance values of the pixels that are determined to be belonging to the same tissue in said determining;
   wherein said determining comprises:
      calculating a similarity level between a first pixel and a second pixel from the plurality of MRI's by using a difference in luminance value of the first pixel and the second pixel in each of the plurality of MRI's, wherein the first and second pixels are from a single MRI; and
      determining whether or not the first pixel and the second pixel belong to a same tissue by comparing the similarity level with a preset threshold, and
   wherein said calculating the new luminance value comprises determining the new luminance value for the first pixel and the second pixel from a weighted average of luminance values of the first pixel and the second pixel based on the similarity level between the first pixel and the second pixel.

3. A denoising apparatus for an MRI, the denoising apparatus comprising:
   an MRI acquisition unit configured to acquire a plurality of MRI's for a same site using different image-acquisition protocols, such that the MRI's have different contrast levels;
   a same-tissue determiner unit configured to determine pixels in each of the plurality of MRI's corresponding to a same tissue by using the plurality of MRI's; and
   a filtering unit configured to calculate a new luminance value for the pixels by using luminance values of the pixels that are determined to be belonging to the same tissue,
   wherein the same-tissue determiner unit comprises:
   a luminance-difference calculator unit configured to calculate a difference in luminance value of the first pixel and the second pixel from the plurality of MRI's, wherein the first and second pixels are from a single MRI; and
   a similarity calculator unit configured to calculate a similarity level between the first pixel and the second pixel by using the difference in luminance value, and
   wherein the filtering unit determines the new luminance value for the first pixel and the second pixel from a weighted average of luminance values of the first pixel and the second pixel based on the similarity level between the first pixel and the second pixel.

4. The denoising apparatus of claim 3, wherein the same-tissue determiner unit comprises:
   a threshold comparison unit configured to determine whether or not the first pixel and the second pixel belong to a same tissue by comparing the calculated similarity level with a preset threshold.

5. The denoising apparatus of claim 1, wherein the image-acquisition protocols include at least one of FLAIR (fluid-attenuated inversion-recovery), T1CE (T1-weighted contrast-enhanced), T1W (T1-weighted), and T2W (T1-weighted), PDW (proton density weighted), and DWI (diffusion-weighted image).

* * * * *